(12) United States Patent
Thorwart

(10) Patent No.: US 10,256,696 B2
(45) Date of Patent: Apr. 9, 2019

(54) ELECTRICALLY ACTUATED ROTARY DRIVE DEVICE

(71) Applicant: FESTO AG & Co. KG, Esslingen (DE)

(72) Inventor: Gerhard Thorwart, Filderstadt (DE)

(73) Assignee: FESTO AG & CO. KG, Esslingen (DE)

( * ) Notice: Subject to any disclaimer, the term of this patent is extended or adjusted under 35 U.S.C. 154(b) by 837 days.

(21) Appl. No.: 14/781,063

(22) PCT Filed: Apr. 5, 2013

(86) PCT No.: PCT/EP2013/001012
§ 371 (c)(1),
(2) Date: Sep. 29, 2015

(87) PCT Pub. No.: WO2014/161563
PCT Pub. Date: Oct. 9, 2014

(65) Prior Publication Data
US 2016/0053856 A1    Feb. 25, 2016

(51) Int. Cl.
*H02K 7/116*    (2006.01)
*F16H 1/10*    (2006.01)

(52) U.S. Cl.
CPC ............. *H02K 7/116* (2013.01); *F16H 1/10* (2013.01); *H02K 7/1163* (2013.01)

(58) Field of Classification Search
CPC .......... H02K 7/116; H02K 7/1163; F16H 1/10
See application file for complete search history.

(56) References Cited

U.S. PATENT DOCUMENTS

| 1,522,068 | A | * | 1/1925 | Morgan | .................... F16H 1/10 |
| | | | | | 184/11.1 |
| 1,988,338 | A | * | 1/1935 | Schmitter | .............. H02K 7/116 |
| | | | | | 310/83 |
| 2,173,339 | A | * | 9/1939 | Myers | ................. F16H 57/0025 |
| | | | | | 310/83 |
| 4,237,571 | A | | 12/1980 | Nelson | |
| 2011/0016960 | A1 | * | 1/2011 | Debrailly | ........... B62D 15/0235 |
| | | | | | 73/115.07 |
| 2011/0265585 | A1 | | 11/2011 | Thorwart et al. | |

FOREIGN PATENT DOCUMENTS

| CN | 102057167 | 5/2011 |
| DE | 1450768 | 7/1970 |
| DE | 102011107012 | 1/2013 |
| JP | 61157805 | 7/1986 |

OTHER PUBLICATIONS

"Orientalmotor" Oriental Motor Europa GmbH Publication, pp. 1 and 4 (2011).

* cited by examiner

*Primary Examiner* — Mohamad Musleh
(74) *Attorney, Agent, or Firm* — Hoffmann & Baron, LLP

(57) ABSTRACT

An electrically actuated rotary drive device which has a gear casing with an electrical drive motor mounted at its rear side and on which is rotatably mounted an output member in driving connection with the drive motor. The driving connection is realized by gearing means provided in the gear casing and containing a driven gear fitted to the output member, in the form of a ring gear with internal tooth system, and a drive pinion belonging to the drive motor and with an external gear teeth system. The drive pinion extends into the ring gear, inside the gear casing.

23 Claims, 4 Drawing Sheets

ELECTRICALLY ACTUATED ROTARY DRIVE DEVICE

This application claims priority based on an International Application filed under the Patent Cooperation Treaty, PCT/EP2013/001012, filed Apr. 5, 2013.

BACKGROUND OF THE INVENTION

The invention relates to an electrically actuated rotary drive device, with a gear casing having a front side, and a rear side opposite the former, and on which is rotatably mounted an output member accessible at the front side of the gear casing and in driving connection with a driven gear mounted rotatably in the gear casing and in gearing engagement with a drive pinion of an electrical drive motor mounted externally at the rear side of the gear casing.

A rotary drive device of this type known from DE 10 2011 107 012 A1 is equipped with a hybrid drive system and also contains, besides an electrical drive motor, a drive device actuatable by fluid power, wherein both the drive motor and also the fluidically actuatable drive device act on an output member accessible at a front side of a gear casing, in order to set this output member into rotary movement. The power flow between the drive motor attached to the rear side of the gear casing and the output member is obtained by means of a gear located inside the gear casing and having a driven gear in driving connection with the output member and a drive pinion drivable by the drive motor and in gearing engagement with the driven gear. Both the drive pinion and the driven gear have an external gear teeth system, so that they are mounted next to one another in a plane at right-angles to the rotation axis and the driven gear is flanked on the radial outside by the drive pinion.

In the case of the known rotary drive device, the electrical drive motor may be accommodated with relative ease, since its dimensions can be kept relatively small due to the presence of the additional drive device operated by fluid power. Problems occur, however, if the rotary drive device is to be operated purely electrically, since the drive motor then required has larger dimensions because of the increased power requirement, with adverse effects on the compactness of the rotary drive device.

Known from a publication of the Oriental Motor Europa GmbH dated 2011, pages 1 and 4, is an electrical rotary drive device in which, similarly, a driven gear provided with an external gear teeth system meshes with a drive pinion, wherein however the engagement zone between the two tooth systems, unlike in the case of DE 10 2011 107 012 A1, is not assigned to a corner zone of the gear casing, but instead lies between two corner zones of a mounting frame.

SUMMARY OF THE INVENTION

The invention is based on the problem of creating a rotary drive device designed for electrical actuation, which may be built with compact dimensions even with high power output.

To solve this problem it is provided that, in connection with the features described above, the driven gear is in the form of a ring gear with an internal tooth system, wherein the drive pinion inside the gear casing dips axially into the ring gear and makes gearing engagement with its internal tooth system.

Because the driven gear is a ring gear with an internal tooth system, the engagement zone between the tooth systems of the drive pinion and the driven gear shifts closer to the rotation axis of the driven gear, as compared to the prior art, so that it is removed from the external contour of the gear casing. In this way, even a drive motor with relatively large cross-sectional dimensions may be attached to the rear side of the gear casing in such a way that it does not protrude or else only slightly protrudes from the external contour of the gear casing. In this way, the rotary drive device may be made with compact lateral dimensions despite increased electrical power.

Advantageous developments of the invention are disclosed in the dependent claims.

At its end face, the output member expediently has a plate- or disc-shaped output wall, on which are formed interface means suitable for the attachment of components rotating in one direction or moving to and fro. Owing to its large surface, the plate- or disc-shaped output wall allows rotary mounting with relatively large radial clearance from the rotation axis, so that the output member is able to withstand even high tilting and/or lateral forces and low-wear operation under high loading is made possible.

Inside the gear casing, the output member expediently has a hollow-cylindrical wall section which supports the driven gear in the form of a ring gear, in a coaxial arrangement. Here there is the advantageous possibility of making the ring gear a single-piece component of the hollow-cylindrical wall section, which is used especially for rotary drive devices of small dimensions.

In particular, but not exclusively in connection with rotary drive devices of relative large dimensions, it is advantageous when the driven gear designed as ring gear is fixed as a separate component to its output member and especially to its expediently provided hollow-cylindrical wall section. The driven gear may for example be fastened to the output member as part of an adhesive bond.

If the output member has a hollow-cylindrical wall section located inside the gear casing, then there is the option of fixing the driven gear, which is separate in this respect, to the hollow-cylindrical wall section either on the radial outside or on the radial inside.

The gear casing is expediently so constructed that it has a casing main member used for rotary mounting of the output member and jointly bounding, with a back wall provided at the rear side, a gear space in which the driven gear is located and in which the gearing engagement between the driven gear and the drive pinion takes place. The drive motor is fixed to the outside of the back wall on the end face and extends with an output member which may be rotary-driven and carries the drive pinion through an opening in the back wall into the gear space. Expediently the drive motor has an output shaft to which the drive pinion is directly attached with no interposed coupling.

It is of advantage for the back wall of the gear casing to be a separate component from the casing main member to which the drive motor is fixed independently of the casing main member. In this way it is possible in particular to attach the drive motor to the back wall with the back wall removed from the casing main member, and then to fasten the back wall including the drive motor attached to it as a unit to the casing main member. This simplifies the assembly of the rotary drive device.

It has proved advantageous to design the gear casing so that, viewed in the axial direction of the rotation axis of the output member, it has four corner zones distributed around the rotation axis of the output member, involving in particular corner zones of an external contour which is at least substantially rectangular. The corner zones are then also free when the output member has a plate- or disc-shaped output wall, which is arranged preferably centrally in the area of the front side of the gear casing. The four corner zones may be used advantageously for external fixing of the gear casing, in order to fasten the rotary drive device to a support structure designed for this purpose. In this connection it is of benefit if a suitable mounting interface is provided in at least one and preferably in each of the four corner zones of the gear casing. It has proved to be especially expedient if the mounting interface is in the form of a mounting hole, extending parallel to the rotation axis of the output member and expediently passing completely through the gear casing in the assigned corner zone.

Due to the fact that the driven gear is in the form of a ring gear, the engagement zone between the drive pinion and the tooth system of the driven gear is shifted closer to the rotation axis of the driven gear, as compared with a driven gear with an external gear teeth system. This makes possible the advantageous option of so positioning the electrical drive motor at the rear side of the gear casing, without relevant impairment of the lateral dimensions, that the aforesaid engagement zone of the tooth systems does not lie in any of the four corner zones of the gear casing. This makes the corner zones of the gear casing available without restriction for external fixing of the rotary drive device.

It is advantageous in this connection when the aforementioned engagement zone lies in a sector which is located between two corner zones of the gear casing adjacent to one another in the circumferential direction of the rotation axis of the output member and the rotation axis of the output member.

When a mounting hole is provided as mounting interface in each of the corner zones, the engagement zone lies expediently in a triangular sector, the three corners of which are formed by the centres of two mounting holes and the rotation axis of the driven gear.

It is also advantageous when the aforementioned engagement zone of the tooth systems lies on a plane designated as the engagement plane, which coincides with the rotation axis of the output member and extends centrally between two corner zones of the gear casing adjacent to one another in the circumferential direction of the aforesaid rotation axis.

Expediently the engagement plane is at an equal distance from two mounting interfaces of the gear casing flanking it on either side.

Especially suitable as drive motor is a stepping motor which, in conjunction with an assigned encoder, permits a very precise rotation angle positioning of the output member. Alternatively, of course, a servomotor may also be used as power source.

For control of the drive motor it is advantageous if the rotary drive device has a sensor which may be used as reference sensor which, starting from the rear side of the gear casing, extends into the gear casing where it cooperates with an actuating element which is stationary relative to the output member. The sensor is in particular so arranged that, from the rear side of the gear casing, it dips axially into the driven gear in the form of a ring gear. The section of the sensor dipping into the ring gear is framed by the internal tooth system of the ring gear.

Preferably, between the drive pinion and the sensor, there is an angular offset of 90° relative to the rotation axis of the output member. In this way, any interaction can be excluded very effectively.

Expediently there extends through the gear casing and the output member a feed-through passage, coaxial to the rotation axis of the output member, which provides scope for the feeding through of power transmission means such as cables or hoses for connection to a component which, for the purpose of rotational positioning, is attached to the output member. In this way for example an electrical or pneumatic power supply may be provided to a gripping device to be attached to the output member.

The feed-through passage extends expediently in a feed-through tube, which is fastened flush to a through hole at the output member and accompanies the rotary movement of the output member. The feed-through tube extends to the rear side from the output member and passes through the gear casing, wherein it expediently engages in a through hole formed in a back wall of the gear casing. This through hole is preferably designed as a guide recess which can provide radial stabilisation for the feed-through tube, and which expediently has a guide bushing made of plastic material, which prevents direct contact of the feed-through tube with the back wall of the gear casing which is preferably made of aluminium material.

There is the advantageous possibility of providing, on the outer face of the gear casing oriented radially with respect to the rotation axis of the output member, one or more additional mounting interfaces, which may be used for fixing the rotary drive device to a support structure.

BRIEF DESCRIPTION OF THE DRAWINGS

The invention is explained in detail below with the aid of the appended drawing, which shows in.

DETAILED DESCRIPTION OF THE PREFERRED EMBODIMENTS

Figure 1:
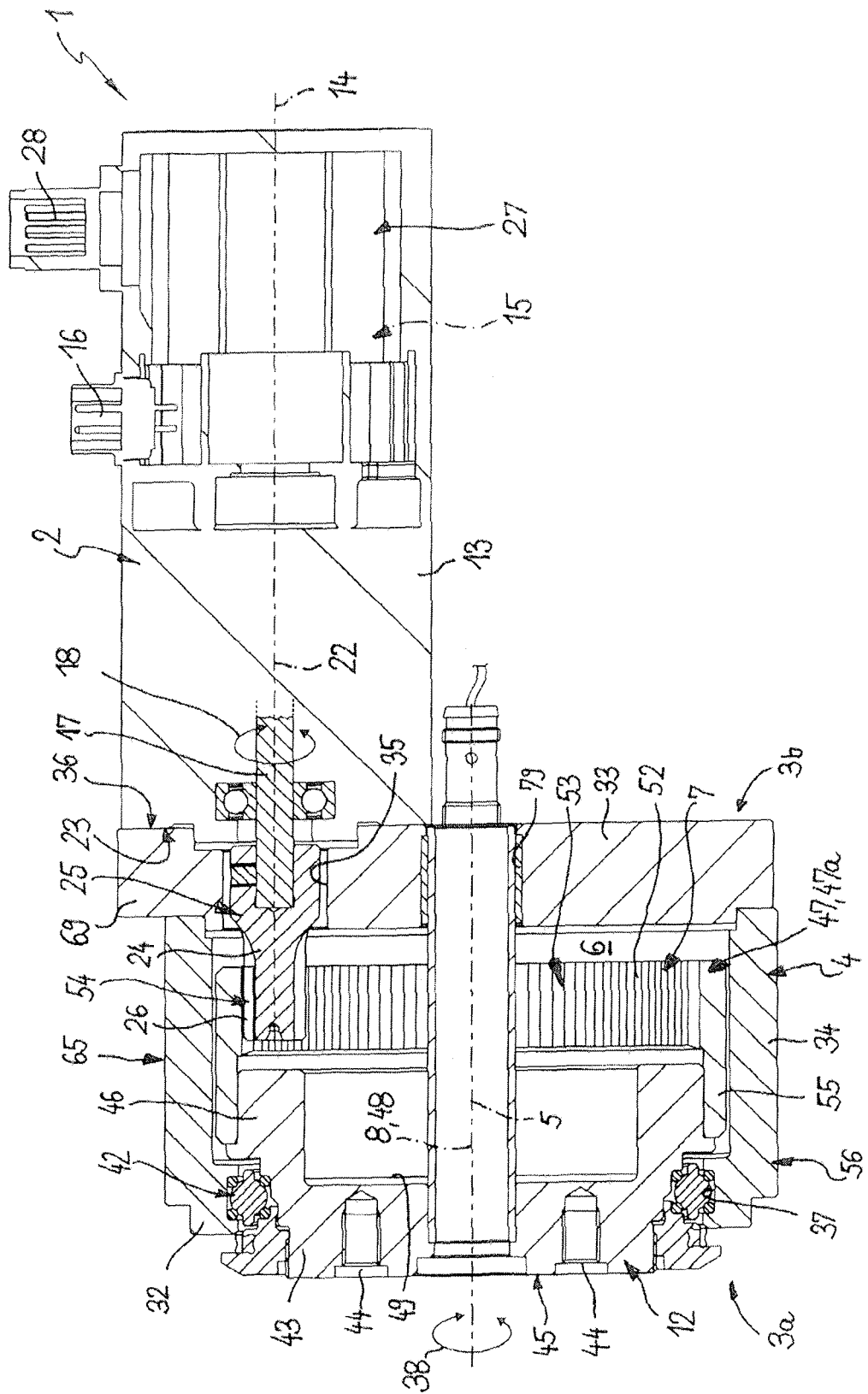
FIG. 1 a longitudinal section through a preferred embodiment of the rotary drive device according to the invention, along section line I-I of FIG. 3, FIG. 2 a longitudinal section of the rotary drive device along section line II-II of FIG. 4, offset by 90° relative to FIG. 1, FIG. 3 an end view of the rotary drive device from the front side lying to the left in FIGS. 1 and 2, and FIG. 4 a rear view of the rotary drive device.

The electrically actuatable rotary drive device designated in its totality by reference number 1 has as power source an electrical drive motor 2, which is mounted at the rear side 3*b* of a gear casing 4 of the rotary drive device 1. The gear casing 4 has an imaginary main axis 5 and a front side 3*a* aligned opposite to the rear side 3*b*, wherein both the front side 3*a* and also the rear side 3*b* are aligned in the axial direction of the main axis 5.

The gear casing 4 bounds an inner space designated below as the gear space 6. Accommodated in this gear space 6 are gearing means 7 of a gear train which creates a driving connection between the drive motor 2 and an output member 12, rotatably mounted on the gear casing 4 around a rotation axis 8.

The rotation axis 8 of the output member 12 has the same alignment as the main axis 5.

The electrical drive motor 2 has a motor housing 13, which preferably has an elongated shape with a motor longitudinal axis 14. Inside the motor housing 13 are electromotive drive means 15 which are able, on the strength of electrical actuating signals fed in at an electrical interface 16, to drive an output shaft 17 mounted rotatably in the motor housing 13 to make an output rotary movement 18 indicated by a double arrow. The rotation axis 22 of the output shaft 17 has the same alignment as the motor longitudinal axis 14.

The motor housing 13 has at its front side an axially-oriented mounting surface 23. The output shaft 17 extends out from this mounting surface 23 and is directly and non-rotatably equipped with a drive pinion 24, which accompanies the output rotary movement 18. Together the output shaft 17 and the drive pinion 24 form an output member 25 of the drive motor 2 which executes the output rotary movement 18 in operation of the drive motor 2.

The drive pinion 24 has an external gear teeth system 26 extending concentrically around the rotation axis 22.

By way of example, the drive motor 2 is in the form of an electrical stepping motor. Alternatively, the drive motor 2 is a servomotor.

Expediently the drive motor 2 is equipped with an encoder 27, indicated only schematically in the drawing. The encoder can detect the rotation position and/or rotation speed of the output member 25 and is able to output the relevant position and/or speed data at a further electrical interface 28, from which it may be fed to an external electronic control unit, not shown in detail.

The gear casing 4 has a front panel 32 assigned to the front side 3a, a back wall 33 assigned to the rear side 3b, and a peripheral side panel 34 extending all around the rotation axis 8 of the output member 12. The back wall 33 is provided, with radial clearance from the rotation axis 8 of the output member 12, i.e. off-centre, with a through hole 35, through which the output member 25 extends axially into the gear space 6 with at least that part of the drive pinion 24 having the external gear teeth system 26, when the drive motor 2 is mounted, with its mounting surface 23 leading, at an attachment face 36 provided for this purpose on the rear side 3b of the back wall 33. The through hole 35 leads to the aforementioned attachment face 36.

The front panel 32 is substantially annular and bounds a mounting hole 37 which at one end is open outwards towards the front side 3a, and at the other end leads into the gear space 6.

In the mounting hole 37, the output member 12 is mounted so as to be rotatable relative to the gear casing 4. The output member 12 is able to execute an output rotary movement 38, illustrated, by a double arrow, relative to the rotation axis 8.

Located between the peripheral outer periphery of the output member 12 and the inner periphery of the mounting hole 37 is a bearing fixture 42, which effects the aforementioned bearing of the output member 12. This bearing fixture 42 is annular in shape and mounted concentric to the rotation axis 8. The bearing fixture 42 is preferably in the form of a roller bearing fixture.

In the embodiment, the bearing fixture 42 has a rim of roller bearing elements which extend all around the output member 12 and rest on rolling surfaces assigned on one side to the side panel 34 and on the other side to the output member 12.

Expediently the output member 12 has at its forward facing end an output wall 43, plate- or disc-shaped in form, with a circular external contour concentric to the rotation axis 8. At least this output wall 43 of the output member 12 is accessible from outside the gear casing 4, so that the output rotary movement 38 may be tapped. The tapping of the output rotary movement 38 is effected for the rotary driving of an external component, not shown in detail, which may be attached, in particular releasably, to the output member 12. Such a component to be driven is for example a pneumatic or vacuum-operated gripping device. In this respect, the rotary drive device 1 may be used for example as part of a handling device, for repositioning workpieces of other objects.

To make possible the attachment of components to be driven, the output member 12 is provided with interface means 44 suitable for this purpose. These are for example formed in or on the output wall 43 of the output member 12. The interface means 44 are accessible at an outer face 45 of the output wall 43 axially opposite the back wall 33, and contain for example several threaded mounting holes.

The output member 12 passes through the mounting hole 37, extending with its rear into the gear space 6. Expediently it has a hollow-cylindrical wall section 46 adjoining the flat output wall 43 at the axial rear side and extending rearwards into the gear space 6 in an arrangement concentric to the rotation axis 8 and towards the back wall 33. The hollow-cylindrical wall section 46 frames a recess 49 of the output member 12 which is open at the rear side, towards the back wall 33.

The output member 12 makes driving connection with a driven gear 47 mounted rotatably inside the gear space 6. Preferably the driven gear 47 is mounted non-rotatably on the output member 12, while its rotation axis 48 coincides with the rotation axis 8 of the output member 12. There may be a releasable or a non-releasable connection between the driven gear 47 and the output member 12.

In an embodiment which is not depicted, the driven gear 47 is joined integrally to the output member 12. In other words, the output member 12 and the driven gear 47 here form a single-piece body.

By way of example, the driven gear 47 is a separate component from the output member 12, being fastened to the output member 12 by suitable fixing measures. If the output member 12, as in the embodiment, has a hollow-cylindrical wall section 46 located in the gear space 6, it is advantageous for the driven gear 47 to be mounted on this hollow-cylindrical wall section 46.

Like the drive pinion 24, the driven gear 47 is part of the gearing means 7. The drive pinion 24 is in gearing engagement with the driven gear 47, so that an output rotary movement 18 of the drive pinion 24 generates a rotary movement of the driven gear 47 around the rotation axis 48, and accordingly also effects the output rotary movement 38 of the output member 12 which is in driving connection with the driven gear 47.

A major advantage of the rotary drive device 1 lies in the fact that it is feasible with compact dimensions at right-angles to the main axis 5 and the rotation axis 8 respectively, even with a a relatively voluminous drive motor 2. The critical factor here is the design of the gearing means 7. Whereas the drive pinion 24, as referred to above, is provided with an external gear teeth system 26, the driven gear 47 is in the form of a ring gear 47a, wherein its tooth system engaging with the external gear teeth system 26 of the drive pinion 24 is an internal tooth system 52 extending concentrically around the rotation axis 48.

By way of example, the driven gear 47 has an annular gearing body 51, which has the continuous internal tooth system 52 on its radial inner periphery.

Preferably the external gear teeth system 26 and the internal tooth system 52 are in the form of straight teeth.

The drive pinion 24 extending into the gear space 6 from the rear dips axially into the ring gear 47a. Its rotation axis 22 is arranged with radial clearance from the rotation axis 48 of the driven gear 47, so that its external gear teeth system 26 is in engagement with the internal tooth system 52 of the ring gear 47a. More precisely, the ring gear 47a and its internal tooth system 52 respectively frame a hollow space 53, into which the drive pinion 24 extends. The pitch circle diameter of the internal tooth system 52 of the ring gear 47*a* is larger and in particular many times larger than that of the external gear teeth system 26 of the drive pinion 24.

The area in which the drive pinion 24 and the driven gear 47 are in engagement with one another is also described below as the engagement zone 54.

By means of the illustrated design of the gearing means 7, the internal tooth system 52 may be provided with a large diameter, to the benefit of a high torque-transmission ratio, without this having an adverse effect on the external lateral dimensions of the gear casing 4, since the drive pinion 24 is in gearing engagement with the driven gear not on the outside of the driven gear 47 but instead in the hollow space 53 framed by the ring gear 47*a*.

In the embodiment, the ring gear 47*a* is fitted on to the radial outside of the hollow-cylindrical wall section 46 by a hollow-cylindrical mounting extension 55, so that axial overlapping results. Here the driven gear 47 may for example be pressed or glued on. Alternatively or additionally, other mounting measures may also be chosen, for example a screw connection.

In an embodiment which is not shown, the ring gear 47*a* is formed on or attached to the inner periphery of the hollow-cylindrical wall section 46.

In the embodiment, the front panel 32 and the side panel 34 of the gear casing 4 define a single-piece casing main member 56. As an alternative to this, the front panel 32 and the side panel 34 may also be made separately to form a multi-part casing main member 56, and joined together by suitable mounting means.

Figure 4:
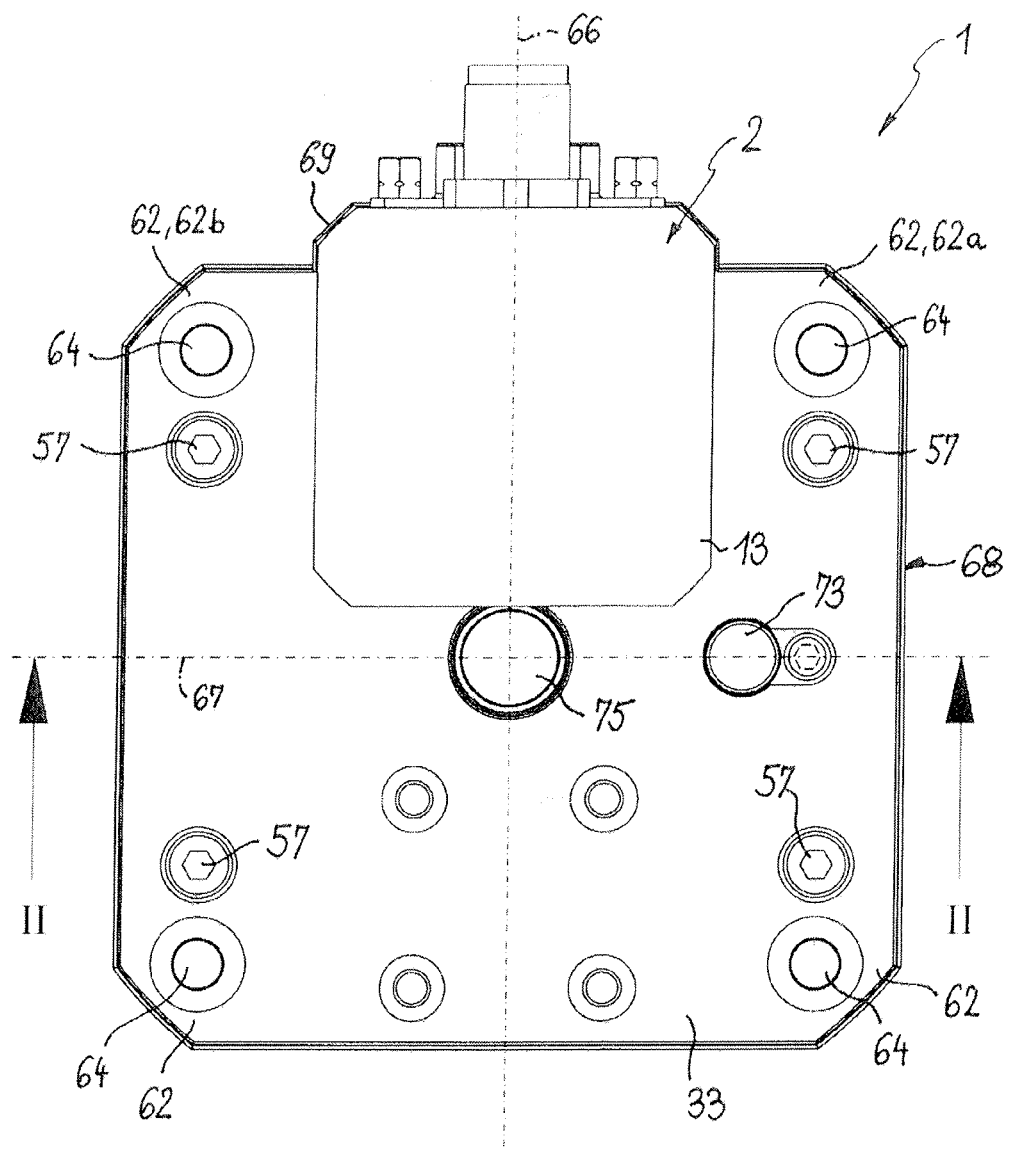

The back wall 33 is expediently made as a separate component from the casing main member 56. It is attached at the rear to the side panel 34 and for example fixed to the casing main member 56 from the rear side in a preferably releasable manner by means of fixing screws 57 evident from FIG. 4.

In the assembly of the rotary drive device 1, the drive motor 2 is expediently attached to the back wall 33 before the back wall 33 is fixed to the casing main member 56. Consequently the back wall 33 and the drive motor 2 may be attached to the casing main member 56 as a pre-assembled unit. In this attachment process, the drive pinion 24 protruding above the back wall 33 on the side opposite the attachment face 36 engages in the ring gear 47*a*.

To fasten the drive motor 2 to the back wall 33, use is made expediently of fixing screws, hereafter described as motor-fixing screws 58, which are guided through the back wall 33 from the front side facing the casing main member 56, and then screwed to the motor housing 13. These motor-fixing screws 58 may be recognised in FIG. 3, and are partly covered by the casing main member 56. The motor-fixing screws 58 are put in place before the back wall 33 is fastened to the casing main member 56.

Preferably the gear casing 4, viewed from the front side 3*a* in the axial direction of the rotation axis 8 of the output member 12, has a polygonal external contour with four corner zones 62 distributed around the aforementioned rotation axis 8. As is evident from FIGS. 3 and 4, the corner zones 62 may be rounded or slanted. The four corner zones expediently form the corner zones of a rectangle and here preferably the corner zones of a square. Preferably therefore the gear casing 4 has an external contour which is at least substantially rectangular and preferably square, viewed in the axial direction of the rotation axis 8.

Figure 3:
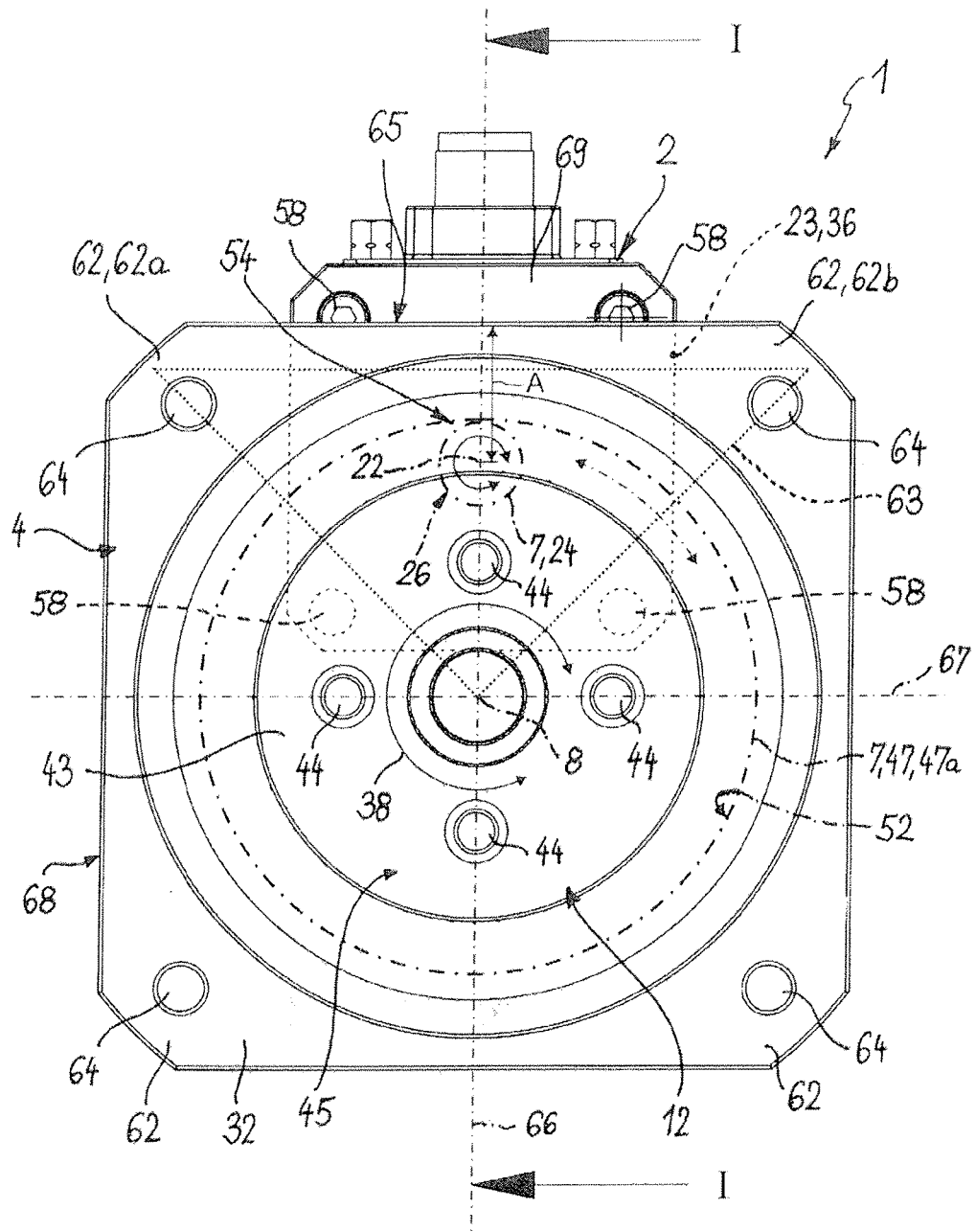

As disclosed in particular by FIG. 3, the gearing means 7 are preferably so designed that the engagement zone 54 defined above lies within an imaginary sector 63 indicated by a dotted line, which is located between two corner zones 62, 62*a*, 62*b* of the gear casing 4 directly adjacent to one another in the circumferential direction of the rotation axis 8 of the output member 12, and the rotation axis 8 of the output member 12. The aforementioned circumferential direction of the rotation axis 8 is aligned with the output rotary movement 38.

This placing of the engagement zone 54 ensures that the corner zones 62 are not covered or occupied by the drive motor 2 attached to the rear side of the gear casing 4. FIG. 3 discloses that the outline of the mounting surface 23 and the assigned attachment face 36 lie between the two corner zones 62*a*, 62*b* spanning the sector 63. The rear view according to FIG. 4 also makes clear that the aforementioned corner zones 62*a*, 62*b* lie next to and are not covered by the drive motor 2.

Thus all corner zones 62 are available if required for fastening the gear casing 2 to a support structure, not shown in detail. In this connection it is advantageous if a mounting interface 64 which may be used for external mounting of the rotary drive device 1 is formed in at least one and preferably in each of the four corner zones 62 of the gear casing 4; irrespective of the drive motor 2 attached at the rear side, this interface is freely accessible, and specifically preferably at both the front side 3*a* and the rear side 3*b*. The mounting interfaces 64 are expediently in the form of mounting holes which pass completely through the gear casing 4, aligned parallel to the rotation axis 8. They are suitable for the insertion of fixing screws.

Due to the depicted design of the gearing means 7, the rotation axis 22 of the drive pinion 24 has a relatively large clearance "A" from the side surface section 65 of the outer face of the side panel 34 running between the two aforementioned corner zones 62*a*, 62*b*. This clearance "A" is easily sufficient to accommodate the drive pinion 24 in the gear casing 4 without having to enlarge its lateral dimensions.

In the embodiment, the engagement zone 54 lies on a plane, described as the engagement plane 66, which coincides with the rotation axis 8 of the output member 12 and extends centrally between the two above-mentioned corner zones 62*a*, 62*b*, arranged directly adjacent to one another in the circumferential direction of the rotation axis 8 of the output member 12.

It may also be said with regard to the preferred embodiment that the rotation axis 22 of the drive pinion 24 lies in the aforementioned engagement plane 66, which has clearance of equal size from the mounting interfaces 64 of the two corner zones 62*a*, 62*b* referred to above. The aforementioned corner zones 62*a*, 62*b* lie on the same side of a lateral plane 67 lying at right-angles to the engagement plane 66.

Preferably the rotary drive device 1 is so designed that the contours of the mounting surface 23 and the attachment face 36 lie within the aforementioned rectangular outline of the gear casing 4. In principle, however, it is also possible to provide an offset between the gear casing 4 and the drive motor 2 such that the drive motor 2 extends to the side for a short distance beyond the preferably at least substantially rectangular external contour 68 of the gear casing 4. This applies to the embodiment. So that, despite such an arrangement, full surface attachment of the mounting surface 23 to the back wall 33 is possible, it is of advantage when the back wall 33 has an assembly extension 69 in an area lying between the adjacent corner zones 62, 32b and protruding beyond the side surface section 65 adjacent towards the front side 3a.

An expedient design of the rotary drive device 1 provides a sensor sensor 73 which may be used for the rotation angle positioning of the output member 12. This sensor 73, operating preferably as an inductive sensor, is used in particular as reference sensor, in order to detect during commissioning for example a specific pre-defined initial rotary position of the output member 12.

The sensor 73 is preferably fastened releasably to the gear casing 4 and cooperates with an actuating element 74 which is stationary relative to the output member 12 and accompanies the rotary movement of the output member 12. This actuating element 74 is for example a ferro-magnetic component, fixed inside the gear space 6 to the output member 12 made preferably of aluminium material.

Figure 2:
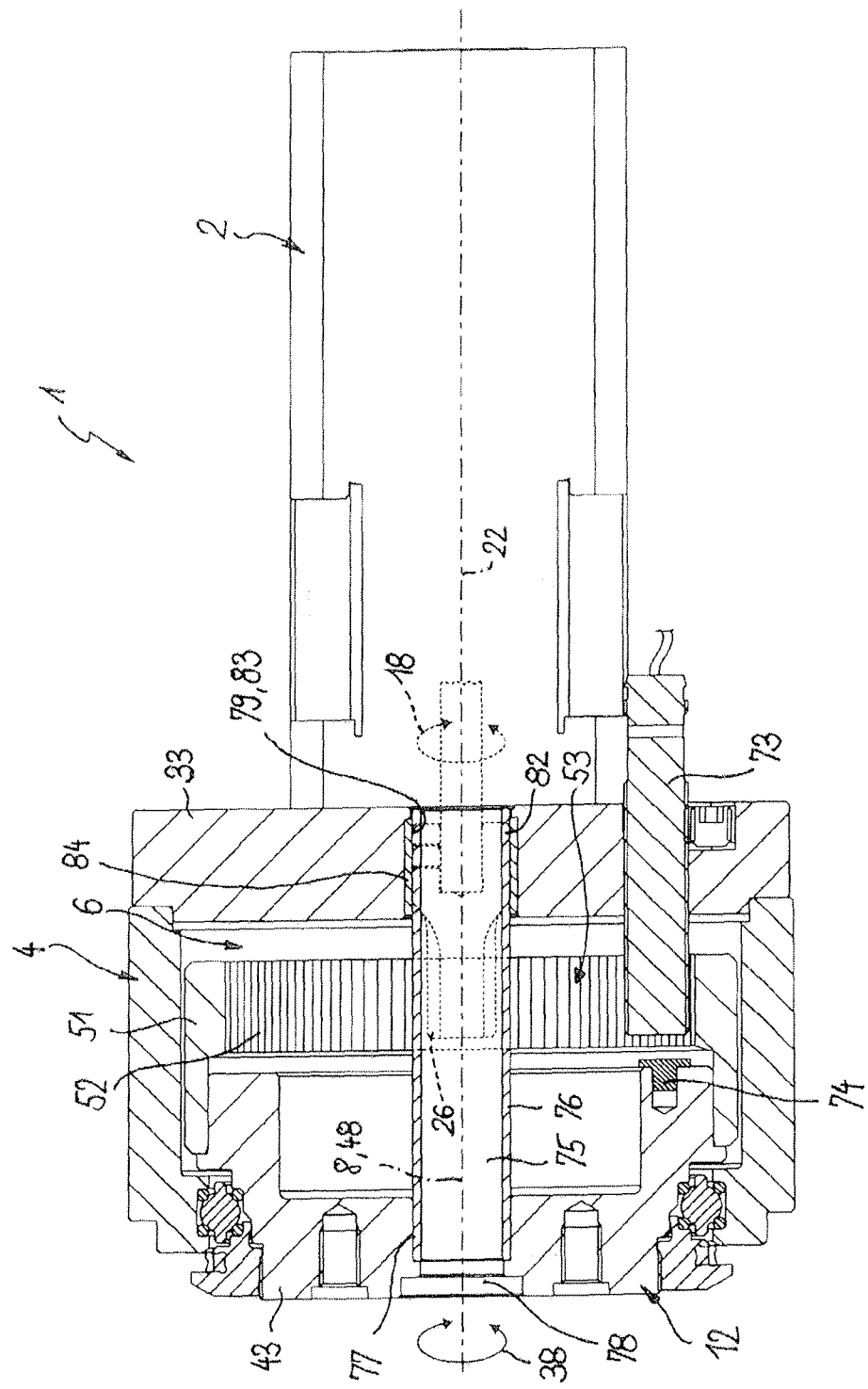

The sensor 73 is expediently mounted on the back wall 33 and extends, as may be seen in FIG. 2, in a comparable manner to the drive pinion 24, from the rear side 3b into the hollow space 53 bounded by the ring gear 47a. The actuating element 74 is fixed to the output member 12 at a point lying on a circle concentric to the rotation axis 8 and axially opposite an end face of the sensor 73. In this way the sensor 73 may be activated each time the actuating element 74 is moved past it during an output rotary movement 38.

The sensor 73 may expediently be attached to the same electronic control unit which is also responsible for actuation of the drive motor 2.

A further advantageous feature of the rotary drive device 1 is a feed-through passage 75 which extends through the gear casing 4 and the output member 12 in an arrangement coaxial to the rotation axis 8. The feed-through passage 75 opens out at one end at the front outer face 45 of the output member 12 and at the other end at the rear side 3b of the gear casing 4, and may be used for the feed-through of power transmission means such as cables or hoses. With such power transmission means, power may be supplied to a component attached at the interface means 44, from the area of the rear side 3b, without the need for recourse to a rotatable intermediate coupling.

Preferably the feed-through passage 75 is realised by means of a feed-through tube 76, which is fixed by a front end section 77 to the output wall 43 in such a way that the tube interior is flush with a central through hole 78 of the output wall 43. For example the feed-through tube 76 is inserted into the central through hole 78 and at the same time in particular pressed, bonded or screwed in place.

Starting from the output wall 43, the feed-through tube 76 extends towards the rear side 3b, wherein it dips with rotary movement facility into a central through hole 79 passing axially through the back wall 33. In this way the feed-through passage 75 is formed by the central through hole 78 of the output wall 43, by the feed-through passage 75 and—depending on the depth of insertion—perhaps also by the central through hole 79 of the back wall 33. The feed-through tube 76 may terminate with its rear end section 82 assigned to the back wall 33 inside the central through hole 79, or also protrude axially from the latter.

The central through hole 79 of the back wall 33 is expediently designed as a guide recess 83 which radially supports the rear end section 82 of the feed-through tube 76, ensuring its ability to rotate. To form the guide recess 83, a guide bushing 84 made of plastic material is expediently inserted in the central through hole 79. This prevents any direct contact of the feed-through tube 76, preferably made of metal, with the back wall 33 also preferably made of metal. The feed-through tube 76 accompanies the output rotary movement 38 of the output member 12.

Preferably the drive motor 2 is able to generate a unidirectional and/or a to-and-fro alternating output rotary movement 18, in order to produce a corresponding unidirectional and/or to-and-fro output rotary movement 38 of the output member 12.

The invention claimed is:

1. An electrically actuated rotary drive device, with a gear casing having a front side and a rear side opposite the front side, on which is rotatably mounted an output member accessible at the front side of the gear casing, which is in driving connection with a driven gear, which is mounted rotatably in the gear casing and with which a drive pinion of an electrical drive motor mounted externally at the rear side of the gear casing is in gearing engagement, wherein the driven gear is in the form of a ring gear with an internal tooth system, wherein the drive pinion inside the gear casing dips axially into the ring gear and makes gearing engagement with its internal tooth system, and wherein a sensor used for rotation angle positioning of the output member, starting from the rear side of the gear casing, extends into the gear casing and cooperates with an actuating element, which is stationary relative to the output member.

2. A rotary drive device according to claim 1, wherein the sensor dips axially into the driven gear which is in the form of a ring gear.

3. An electrically actuated rotary drive device, with a gear casing having a front side and a rear side opposite the front side, on which is rotatably mounted an output member accessible at the front side of the gear casing, which is in driving connection with a driven gear, which is mounted rotatably in the gear casing and with which a drive pinion of an electrical drive motor mounted externally at the rear side of the gear casing is in gearing engagement, wherein the driven gear is in the form of a ring gear with an internal tooth system, wherein the drive pinion inside the gear casing dips axially into the ring gear and makes gearing engagement with its internal tooth system, and wherein a feed-through passage extends through the gear casing and the output member, coaxial to the rotation axis of the output member, which opens out at the front side of the output member and at the rear side of the gear casing and may be used for the feeding through of power transmission means such as cables or hoses.

4. A rotary drive device according to claim 3, wherein, at its end face, the output member has a plate- or disc-shaped output wall, on which are formed interface means suitable for the fixing of a component which is to be driven.

5. A rotary drive device according to claim 3, wherein, inside the gear casing, the output member has a hollow-cylindrical wall section, which supports the driven gear, which is in the form of a ring gear, in a coaxial arrangement.

6. A rotary drive device according to claim 5, wherein the driven gear is fixed to the radial outside or the radial inside of the hollow-cylindrical wall section of the output member.

7. A rotary drive device according to claim 3, wherein the driven gear is attached to the output member as a separate component.

8. A rotary drive device according to claim 7, wherein the driven gear is attached to a hollow-cylindrical wall section of the output member.

9. A rotary drive device according to claim 3, wherein the gear casing has a casing main member on which the output member is rotatably mounted and which, together with a back wall of the gear casing assigned to the rear side, bounds a gear space accommodating the driven gear, wherein the drive motor is fixed to the outside of the back wall, and wherein an output member of the drive motor, which has the drive pinion and may be rotary-driven, extends through the back wall into the gear space.

10. A rotary drive device according to claim 9, wherein the back wall is a separate component from the casing main member, with the drive motor being fastened to the back wall independently of the casing main member.

11. A rotary drive device according to claim 10, wherein the drive motor is releasably fastened to the back wall.

12. A rotary drive device according to claim 3, wherein the gear casing, viewed from the front side in the axial direction of the rotation axis of the output member, has an external contour with four corner zones distributed around the rotation axis, wherein an engagement zone, in which the drive pinion is in gearing engagement with the driven gear, lies in a sector lying between two corner zones adjacent to one another in the circumferential direction of the rotation axis of the output member and the rotation axis of the output member.

13. A rotary drive device according to claim 12, wherein there is, formed in several of the four corner zones of the gear casing, a mounting interface, which may be used for external mounting of the rotary drive device.

14. A rotary drive device according to claim 13, wherein the rotation axis of the drive pinion, which is parallel to the rotation axis of the output member, lies in an engagement plane, which has clearance of equal size from the mounting interfaces of the gear casing lying either side of this engagement plane on the same side of a lateral plane lying at right-angles to the engagement plane.

15. A rotary drive device according to claim 13, wherein each mounting interface is in the form of a mounting hole extending parallel to the rotation axis of the output member.

16. A rotary drive device according to claim 13, wherein a mounting interface is formed in each of the four corner zones of the gear casing.

17. A rotary drive device according to claim 12, wherein the gear casing, viewed from the front side in the axial direction of the rotation axis of the output member, has an external contour which is at least substantially rectangular.

18. A rotary drive device according to claim 3, wherein the gear casing, viewed from the front side in the axial direction of the rotation axis of the output member, has an external contour with four corner zones distributed around the rotation axis, wherein an engagement zone, in which the drive pinion is in gearing engagement with the driven gear, lies on an engagement plane coinciding with this rotation axis and extending centrally between two corner zones of the gear casing adjacent to one another in the circumferential direction of the rotation axis of the output member.

19. A rotary drive device according to claim 18, wherein the gear casing, viewed from the front side in the axial direction of the rotation axis of the output member, has an external contour which is at least substantially rectangular.

20. A rotary drive device according to claim 3, wherein the drive motor is fitted, with an end face mounting surface leading, to an attachment face of a back wall of the gear casing, which is formed partly on an assembly extension of the back wall of the gear casing, which extends beyond an external contour of the gear casing, which is at least substantially rectangular.

21. A rotary drive device according to claim 3, wherein the drive motor is a stepping motor or a servomotor and/or wherein the drive motor is equipped with an encoder for the rotary position and/or rotation speed of the output member.

22. A rotary drive device according to claim 3, wherein the feed-through passage is formed at least partly in a feed-through tube, which is fastened to the output member, passes through the gear space of the gear casing accommodating the driven gear and engages rotatably in a through hole formed in a back wall of the gear casing.

23. A rotary drive device according to claim 22, wherein the through hole is designed as a guide recess.

* * * * *